July 26, 1949.  E. JACOBI  2,477,062
APPARATUS FOR RECORDING OF RAPIDLY VARYING PROCESSES
Filed Oct. 28, 1941
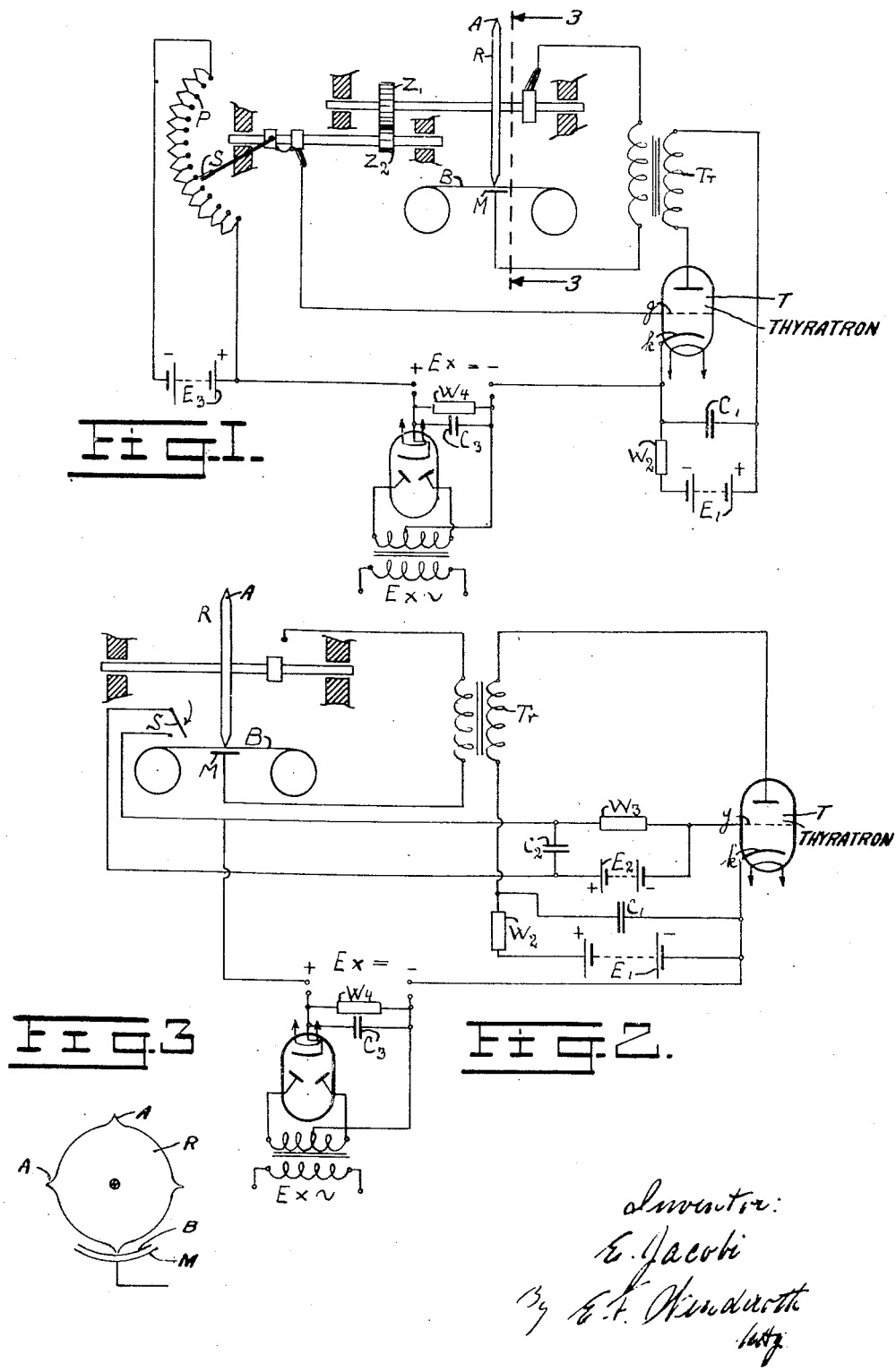

Patented July 26, 1949

2,477,062

UNITED STATES PATENT OFFICE 2,477,062

APPARATUS FOR RECORDING OF RAPIDLY VARYING PROCESSES

Ernst Jacobi, Oslo, Norway; vested in the Attorney General of the United States

Application October 28, 1941, Serial No. 416,911
In Czechoslovakia March 2, 1939

4 Claims. (Cl. 346—33)

The invention concerns an apparatus for recording rapidly varying processes. Many of the rapidly varying processes which are required to be recorded are of electrical nature. Others which are difficult to subject to direct recording can be converted to electrical quantities so as to be more conveniently registered. In all these cases it is sufficient to consider a voltage dependent on the measured quantity which will be dealt with in the following.

The hitherto known appliances for recording of voltage, provided with recording needle and based on the revolving-drum principle, are by reason of their slowness of adjustment suitable only for measurement of slowly varying voltages. The efforts to attain an acceleration of the adjustment have led to curtailment of the time of adjustment for a complete amplitude down to 230 milliseconds.

For the cathode-ray oscillograph the time of adjustment is, it is true, reduced to nil, but to render the record visible, it is necessary to develop photographic sensitized paper or film. The photographic processes demand much time and are rather expensive.

The subject of the present invention is an appliance which records only disconnected momentary voltage values in directly visible writing at intervals corresponding to less than 10 milliseconds. The intervals between the registrations are so short that the voltage curves obtained are sufficiently near to the form of an unbroken line for many scientific and technical purposes. The characteristic feature of the apparatus according to the invention consists therein that the recording of the measured quantity takes place in accordance with the time that elapses until a varying voltage in co-operation with a voltage dependent on the measured quantity has acquired a particular value.

Fig. 1 shows a schematic diagram of one embodiment of the invention,

Fig. 2 illustrates a modified version of Fig. 1, and

Fig. 3 is a view of part of the apparatus on line 3—3 of Fig. 1.

An illustrative example of the principle of measurement according to the invention is given in Figs. 1 and 3. A wheel R, provided with one or more recording pins A, rotates over a band B of litmus-paper or similar material moving in the direction of the axle of the wheel. The paper is given a concave shape, so that the recording pins on the wheel touch upon the band of paper over almost its entire breadth. The pressure of the recording pins on the paper is met by a counterpressure from a similarly concave shaped metal plate M, so that an electrical current can flow through the paper between the recording pins and the metal plate.

This current is produced by an impulse voltage generated at the secondary terminals for a transformer $Tr$. The current through the primary coil of the transformer $Tr$ arises as a discharge from the condenser $C1$ via a thyratron T. The condenser $C1$ is charged via a resistance $W2$ from a source of energy $E1$. The cathode $k$ of the thyratron is connected with the minus-pole for the voltage $Ex$ which is to be measured, while the grid $g$ of the thyratron is connected with the plus-pole for the voltage $Ex$ which is to be measured, via the potentiometer P, where the grid acquires a variable negative preliminary voltage through the slide-brush S. Current is conveyed to the potentiometer P from the source of energy $E3$.

It is now only necessary to bring about a synchronism between the movement of the recording pins of the wheel R and the slide-brush S. This is effected by a suitable gearing between the two cogwheels $Z1$ and $Z2$. Care must be taken that at the moment when the recording pins of the wheel R touch the paper B the potentiometer shall supply the grid with maximum preliminary negative voltage.

The process of measurement is effected as follows: According as the recording pin pursues its course over the band of paper, the slide-brush moves from one point of contact on the potentiometer to the next and so on, whereby the negative voltage on the thyratron grid is steadily diminished. Not until this negative voltage in the grid becomes sufficiently small will the grid-voltage, which is composed of this preliminary voltage and the momentary value of the voltage that is to be measured, attain the value which will bring the thyratron to ignition. At this moment the condenser $C1$ will discharge itself via the transformer $Tr$ and thyratron, thus bringing about a colouring of the paper at the point thereon which corresponds to the height of the preliminary voltage or to the height of the voltage which is to be measured.

Through this arrangement any desired form of graduation scale can be selected. According to the dimensioning of the resistances there can be produced a linear, a logarithmic or an irregular form of scale.

Assuming that the apparatus, as already mentioned, records one point at intervals of 10 milliseconds, i. e. 100 points per second, a frequency of 10 cycles per second can be recorded with sufficient accuracy. By recording 1000 points per second, about 100 cycles per second can be registered.

For measurement of alternating voltages one can in known manner—as shown in the drawing—employ a current rectifier, for example by means of a duodiode with a combination of a resistance W4 and condenser C3. In such case the peak-voltage curve is measured. It is advisable to make the time-constant for this combination a little greater than the time-interval between two registrations.

Instead of being recorded chemically by use of litmus paper, the voltages may also be registered by perforation of the paper by passage of an electric spark. It will then be desirable to give the recording pins a preliminary voltage through a condenser.

Fig. 2 shows another possible form of execution for the invention. Here the wheel R, the paper ribbon B, the metal plate M, the transformer Tr, the condenser C1 and the source of energy E1 are arranged as in the mode of execution shown in Fig. 1. Likewise the cathode $k$ of the thyratron T is connected with the minus-pole of the voltage Ex which is to be measured. However, the diminishing negative grid-voltage is not produced by means of a potentiometer with rotating slide-brushes, but in the following manner: Through the resistance W3 there flows a current from the source of energy E2 to charge the condenser C2. Thereby is created through the resistance W3 with the negative side at the thyratron grid a preliminary grid-voltage which during the course of a charging of the condenser diminishes in logarithmic form. The condenser C2 is discharged through the short-circuit switch S.

Synchronism between the movement of the recording pins of the wheel R and the opening of the switch S must be established. It must be ensured that the switch S opens when a recording pin touches the paper and that the switch closes shortly after the pin has left the paper. Several parallelly situated switches or other coupling methods may also be employed.

The process of measuring takes place as follows: When the recording pin comes in contact with the paper, the switch S opens. The maximum preliminary voltage through the resistance W3 is diminished simultaneously with the movement of the pin over the breadth of the paper. Not until the preliminary negative grid voltage is sufficiently small will the grid voltage which is composed of this preliminary voltage and the momentary value of the voltage that is to be measured reach the value which brings the thyratron to ignition. The rest of the process takes place as described in connection with Fig. 1, that is, the condenser C1 will discharge through the thyratron T and the primary of transformer Tr and the current induced in the secondary flowing through a pin A of the wheel R and paper B produce an indicating mark on the paper. The form of the scale for the arrangement according to Fig. 2 is logarithmic. A linear form of scale can, as is known, be attained by means of a pentode.

I claim:

1. In an apparatus for recording rapidly varying electrical potentials on a longitudinally moving recording strip, a recording pin, means for moving said pin transverse to said strip, means for producing an auxiliary periodically varying electric potential, impulse means controlled by the sum of the electric potential to be recorded and the said auxiliary potential in such a manner that an impulse is given to the recording pin when the potential sum reaches a predetermined value, said impulse means comprising a thyratron tube having an input circuit and an output circuit, means for applying said potential sum to said input circuit, a direct current source connected to energize said output circuit, a resistor in series with said direct current source, a condenser in shunt with said resistor and direct current source and means in said output circuit for supplying energy of discharge of said tube to said pin.

2. Apparatus for recording rapidly varying electrical potentials comprising in combination a recording pin, means for moving said pin in a direction transverse to a recording strip, means for producing an auxiliary periodically varying electric potential which includes a network having a direct current source, a resistor and a condenser in series and a switch in shunt with said condenser adapted to be open when said recording pin is moving transversely to said recording strip, impulse means controlled by the sum of the electric potential to be recorded and the said auxiliary potential for applying an impulse voltage to the recording pin when the said potential sum reaches a predetermined value and means for opening said switch prior to movement of said pin transverse of said strip and closing said switch on completion of said transverse movement.

3. The combination of claim 2 in which said impulse means comprises a thyratron tube having an input circuit and an output circuit, means for applying said potential sum or difference to said input circuit, a direct current source connected to energize said output circuit, a resistor in series with said direct current source, and a condenser in shunt with the resistor and the direct current source.

4. Apparatus for recording rapidly varying electrical potentials comprising in combination a recording pin, means for moving said pin in a direction transverse to a longitudinally moving recording strip, means for producing an auxiliary periodically varying electric potential which includes a network producing a logarithmically variable voltage and provided with shunting means adapted to be open when said recording pin is moving transversely to said recording strip, impulse means controlled by the sum of the electric potential to be recorded and the said auxiliary potential for applying an impulse voltage to the recording pin when the said potential sum reaches a predetermined value and means for opening said shunting means prior to the transverse movement of said pin and closing said shunting means on completion of the transverse movement.

ERNST JACOBI.

REFERENCES CITED

The following references are of record in the file of this patent:

UNITED STATES PATENTS

| Number | Name | Date |
|---|---|---|
| 2,228,883 | Morgan | Jan. 14, 1941 |
| 2,321,605 | Keinath | June 15, 1943 |
| 2,340,880 | Keinath | Feb. 8, 1944 |
| 2,348,711 | Chappell | May 16, 1944 |

FOREIGN PATENTS

| Number | Country | Date |
|---|---|---|
| 221,077 | Great Britain | Sept. 4, 1924 |
| 241,505 | Great Britain | Mar. 31, 1926 |
| 432,922 | Great Britain | Aug. 6, 1935 |